(12) United States Patent
Lu et al.

(10) Patent No.: US 11,807,465 B2
(45) Date of Patent: Nov. 7, 2023

(54) SYSTEM FOR MONITORING SCARPER CHAIN BASED ON MEASUREMENT ON TRANSMITTANCE OF TORSION SPRING AND METHOD THEREOF

(71) Applicant: CHINA UNIVERSITY OF MINING AND TECHNOLOGY, Xuzhou (CN)

(72) Inventors: Hao Lu, Xuzhou (CN); Hui Jiang, Xuzhou (CN); Zhencai Zhu, Xuzhou (Continued)

(73) Assignee: CHINA UNIVERSITY OF MINING AND TECHNOLOGY, Xuzhou (CN)

( * ) Notice: Subject to any disclaimer, the term of this patent is extended or adjusted under 35 U.S.C. 154(b) by 50 days.

(21) Appl. No.: 17/802,188

(22) PCT Filed: Jun. 15, 2021

(86) PCT No.: PCT/CN2021/100006
§ 371 (c)(1),
(2) Date: Aug. 25, 2022

(87) PCT Pub. No.: WO2022/188283
PCT Pub. Date: Sep. 15, 2022

(65) Prior Publication Data
US 2023/0118041 A1  Apr. 20, 2023

(30) Foreign Application Priority Data
Mar. 8, 2021 (CN) ............................ 202110250000.7
Apr. 19, 2021 (CN) ............................ 202110417482.0

(51) Int. Cl.
B65G 43/06  (2006.01)
B65G 19/20  (2006.01)
B65G 43/02  (2006.01)

(52) U.S. Cl.
CPC ................................... *B65G 43/06* (2013.01); *B65G 19/20* (2013.01)

(58) Field of Classification Search
None
See application file for complete search history.

(56) References Cited

U.S. PATENT DOCUMENTS 6,460,422 B1   10/2002   Kuroda et al.
7,448,488 B2 *  11/2008   Narumi ................ B65G 19/20
                                                    198/810.01
(Continued)

FOREIGN PATENT DOCUMENTS

CN      1030642 A    1/1989
CN    104229427 B    3/2016
(Continued)

OTHER PUBLICATIONS

International Search Report issued in International No. PCT/CN2021/100006; mailed Aug. 19, 2021; 4 pgs.
(Continued)

*Primary Examiner* — Kavel Singh
(74) *Attorney, Agent, or Firm* — HAUPTMAN HAM, LLP

(57) ABSTRACT

The present disclosure provides a system for monitoring a scraper chain based on a measurement on transmittance of a torsion spring and a method thereof. The system includes a sprocket-wheel torsion detection device, a fixing device, a wireless receiver, an A/D converter and an industrial computer. In the method, the relative torsion of the two sprocket wheels is converted into the density change of the torsion spring, the light transmission area is converted into the current value by the laser sensing panel, a varying range of the torsion spring is calculated by the industrial computer through the preset threshold and its own program to monitor the operating conditions of the chain. The method has a novel concept, a stable and reliable system, and a high promotion value.

8 Claims, 4 Drawing Sheets

(72) Inventors: (CN); Guohua Cao, Xuzhou (CN);
Yuxing Peng, Xuzhou (CN); Gongbo Zhou, Xuzhou (CN); Gang Shen, Xuzhou (CN); Fan Jiang, Xuzhou (CN); Yu Tang, Xuzhou (CN); Xiang Li, Xuzhou (CN); Wei Wang, Xuzhou (CN)

(56) References Cited

U.S. PATENT DOCUMENTS

| | | | | |
|---|---|---|---|---|
| 7,604,113 | B2* | 10/2009 | Pluszynski et al. | B65G 23/06 |
| | | | | 474/96 |
| 10,065,804 | B1* | 9/2018 | Jiang et al. | B65G 43/06 |
| 10,173,846 | B2* | 1/2019 | Yang et al. | B65G 45/14 |

FOREIGN PATENT DOCUMENTS

| | | | |
|---|---|---|---|
| CN | 105865352 | A | 8/2016 |
| CN | 106829390 | A | 6/2017 |
| CN | 107120398 | A | 9/2017 |
| CN | 107777288 | A | 3/2018 |
| CN | 110498188 | A | 11/2019 |
| CN | 212149136 | U | 12/2020 |

OTHER PUBLICATIONS

Written Opinion issued in International No. PCT/CN2021/100006; mailed Aug. 19, 2021; 8 pgs.

* cited by examiner

SYSTEM FOR MONITORING SCARPER CHAIN BASED ON MEASUREMENT ON TRANSMITTANCE OF TORSION SPRING AND METHOD THEREOF

RELATED APPLICATIONS

The present application is a U.S. National Phase of International Application Number PCT/CN2021/100006, filed Jun. 15, 2021, and claims priority to Chinese Application Numbers CN 202110250000.7, filed Mar. 8, 2021, and CN 202110417482.0, filed Apr. 19, 2021.

TECHNICAL FIELD

The present disclosure relates to the field of monitoring a scarper conveyor chain, in particular to a system for monitoring a scraper chain based on measurement on transmittance of a torsion spring and a method thereof.

BACKGROUND

The scraper conveyor is a kind of typical flexible traction transportation equipment, which plays the role of loading and transportation, supporting the shearer, guiding the shearer and so on in fully mechanized coal mining. In operation of the scraper conveyor, the component which is most prone to failure is the scraper chain. The scraper chain failure accounts for 63% in the total failures of the scraper conveyor, and 42% of the downtime of the scraper conveyor is caused by the breakage of the scraper chain. Once the scraper conveyor fails, it will directly affect the production capacity of the coal mining working face.

A Chinese patent CN106829390A discloses a broken chain detection device for a scraper conveyer and a method of a broken chain detection device, in which infrared photoresistors on both sides of a chute are used to compare and detect the passing time of the two ends of the same scraper to determine whether the scraper is inclined and whether the chain is broken, and the broken chain is detected from the perspective of the operating state of the scraper. A Chinese patent CN104229427B discloses a detection method for a chain breakage of a scraper conveyor, in which the stress sensor installed on the contact surface of the sprocket chain is used to determine whether the chain is broken or not, and the broken chain is detected from the perspective of mechanics.

A Chinese patent CN107777288A discloses a real-time monitoring system and a method for a chain breakage of a scraper conveyer, in which the relative offset conditions of two scraper chains are monitored by strain gauges installed on the chain link and node positioning, so as to determine whether the chain breakage occurs. Due to the harsh operating environment of the scraper conveyor, the strain gauge installed on the chain link of the load part may be affected, and this method is to detect and monitor the scarper chain from the perspective of its position variation.

SUMMARY

For the above-mentioned detection methods based on different perspectives, the objective of the present disclosure is to provide a new system for monitoring a scarper chain based on a measurement on transmittance of a torsion spring and a method thereof, which eliminates the defects of low accuracy and low reliability of the existing scraper conveyor chain monitoring system.

To solve the above-mentioned technical problems, the following technical solutions are adopted in the present disclosure.

Provided in the present disclosure is a system for monitoring a scarper chain based on a measurement on transmittance of a torsion spring. The system includes a sprocket-wheel torsion detection device, a fixing device, a wireless receiver, an A/D converter and an industrial computer. The sprocket-wheel torsion detection device includes a transmission shaft with sprocket wheels fixed at both ends of the transmission shaft. A middle part of the transmission shaft is sheathed in a torsion spring. Both ends of the torsion spring are fixedly connected to one end face of the sprocket wheel at a side proximate to the transmission shaft through a support, respectively. A laser sensing panel is adhered to a middle part of an outer surface of the transmission shaft. The laser sensing panel is covered by the torsion spring with a certain distance from the torsion spring. The fixing device is provided with a laser illuminator, and an illuminating end of the laser illuminator is aligned with a sensing area of the laser sensing panel. A signal acquisition device, a wireless transmitter and a power supply unit are further arranged in the fixing device. The power supply unit is respectively electrically connected with the laser illuminator, the signal acquisition device and the wireless transmitter. The signal acquisition device is electrically connected with the wireless transmitter. The laser sensing panel is electrically connected with the signal acquisition device in the fixing device through a shielded conductive wire, and the wireless receiver, the A/D converter and the industrial computer are electrically connected to one another in sequence.

Preferably, the both ends of the torsion spring are fixedly connected to the end face of the sprocket wheels at the side proximate to the transmission shaft by welding, respectively.

Preferably, safety distances between welding joints at the both ends of the torsion spring and the fixing device are maintained to prevent the torsion spring from contacting and colliding with the fixing device at a deformation limit.

Preferably, the torsion spring is in a type of a separately-wound type and gaps between coils of the torsion spring are maintained. The torsion spring is in a loosened state when installing, where an illuminated area of the laser sensing panel accounts for 50% of a total area of the laser sensing panel, and the torsion spring is installed coaxially with the transmission shaft and maintains a certain distance from a surface of the transmission shaft.

Preferably, the fixing device is in a shape of a square box, and the wireless transmitter, the signal acquisition device and the power supply unit are all integrated in the square box.

Preferably, the laser illuminator is installed at a middle part of an upper end face of the fixing device, and emits a visible light laser to the sensing area of the laser sensing panel when the system is in operation.

Preferably, coils of the torsion spring are capable of covering the laser sensing panel completely both at a compression limit and at a stretch limit.

Provided in the present disclosure is further a method for monitoring a scarper chain based on a measurement on transmittance of a torsion spring. The method specifically includes the following steps.

In S1, an industrial computer is initialized and threshold currents I1, I2, I3, I4, I5 and I6 are set sequentially corresponding to different current values I generated for an illuminated area of a laser sensing panel being of 5%, 25%, 45%, 55%, 75%, or 95%.

In S2, a current signal I of the laser sensing panel is acquired in real time by a signal acquisition device, and the signal is transmitted to the industrial computer during a normal operation of a scarper conveyor.

In S3, the obtained current signal I is compared with the different threshold currents by the industrial computer..It is determined that the illuminated area S of the laser sensing panel is greater than or equal to 5% and less than or equal to 25%, when $I1 \leq I \leq I2$; it is determined that the illuminated area S of the laser sensing panel is greater than 25% and less than or equal to 45%, when $I2 < I \leq I3$; it is determined that the illuminated area S of the laser sensing panel is greater than 45% and less than or equal to 55%, when $I3 < I \leq I4$; it is determined that the illuminated area S of the laser sensing panel is greater than 55% and less than or equal to 75%, when $I4 < I \leq I5$; it is determined that the illuminated area S of the laser sensing panel is greater than 75% and less than or equal to 95%, when $I5 < I \leq I6$.

In S4, a range of S is calculated by the industrial computer through the current signal I obtained in real time, and a varying range of M is calculated by a formula of $$M = \frac{2\pi^2 \, Ed^3 c}{3667abH} \left( \frac{abc - abdn_0}{c} - S \right)$$

.; when $5\% \leq S \leq 25\%$, $M1 \leq M \leq M2$; when $25\% < S \leq 45\%$, $M2 < M \leq M3$; when $45\% < S \leq 55\%$, $M3 < M \leq M4$; when $55\% < S \leq 75\%$, $M4 < M \leq M5$; when $75\% < S \leq 95\%$, $M5 < M \leq M6$;

where, M denotes a torque acting on the torsion spring, positive and negative signs of values of M denotes that whether a direction of the torque is the same as a spiral direction of the torsion spring, E denotes an elastic modulus of a material of the torsion spring, d denotes a diameter of coils of the torsion spring, c denotes an axial length of a number of the working coils of the torsion spring, a denotes a width of the laser sensing panel, b denotes a length of the laser sensing panel, H denotes a stretched length of the torsion spring, n0 denotes an initial number of the coils of the torsion spring, and S denotes the illuminated area of the laser sensing panel.

In S5, whether the chain of the scraper conveyor is broken or stuck is determined according to the calculated range of S by the industrial computer. It is determined that the chain of the scraper conveyor is broken, when $I1 < I \leq I2$, that is, $M1 < M \leq M2$ or $I5 < I \leq I6$, that is, $M5 < M \leq M6$; it is determined that the chain of the scarper conveyor is stuck, when $I2 < I \leq I3$, that is, $M2 < M \leq M3$ or $I4 < I \leq I5$, that is $M4 < M \leq M5$; and it is determined that the chain of the scarper conveyor is operated normally, when $I3 < I \leq I4$, that is $M3 < M \leq M4$.

In S6, Steps S2 to S5 are repeated to monitor the chain of the scraper conveyor in real time.

The beneficial effects of the present disclosure lie in the following. Each component of the monitoring system used in the present disclosure is installed on the transmission shaft, and the torsion spring is only fixed to an inner side of one end face of the sprocket wheel proximate to the transmission shaft, the stretching amount of the torsion spring can indirectly and accurately reflect the operating state of the sprocket wheel and chain, which cooperates the industrial computer to monitor the state of the sprocket wheel of the scarper conveyor. In the method, the relative torsion of the two sprocket wheels is converted into the density change of the torsion spring, the light transmission area is converted into the current value by the laser sensing panel, a varying range of the torsion spring is calculated by the industrial computer through the preset threshold and its own program to monitor the operating conditions of the chain. Compared with the direct measurement on the relative torsion of the two sprocket wheels, the device is easy to be installed and has a low difficulty in later maintenance, and it has a novel concept, a stable and reliable system, and a high promotion value.

BRIEF DESCRIPTION OF THE DRAWINGS

To describe the technical solutions in the embodiments of the present disclosure or in the prior art more clearly, the following will briefly introduce the accompanying drawings required for describing the embodiments or the prior art. It will be apparent that the accompanying drawings in the following description merely illustrate some embodiments of the present disclosure, and those of ordinary skilled in the art may still derive other accompanying drawings from these accompanying drawings without creative efforts.

DESCRIPTION OF REFERENCE NUMERALS

1. Laser illuminator; 2. Shielded conductive wire; 3. Laser sensing panel; 4. Torsion spring; 5. Sprocket wheel; 6. Transmission shaft, 7. Fixing device; 8. Wireless receiver; 9. A/D converter; 10. Industrial computer; 11. Support.

DETAILED DESCRIPTION OF THE EMBODIMENTS

The technical solutions in the embodiments of the present disclosure will be clearly and completely described below with reference to the accompanying drawings of the embodiments of the present disclosure. It will be apparent that the described embodiments are merely some rather than all of the embodiments of the present disclosure. Based on the embodiments of the present disclosure, other embodiments acquired by those of ordinary skilled in the art without creative effort all belong to the protection scope of the present disclosure.

Figure 1:
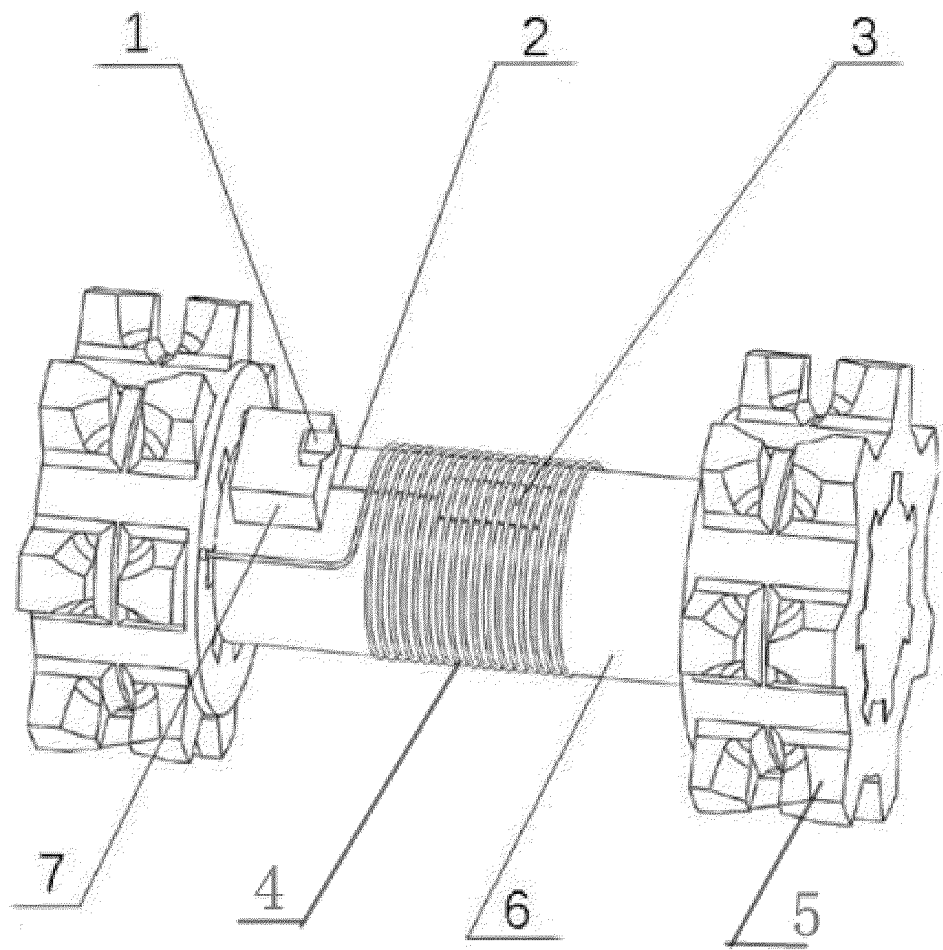
FIG. 1 illustrates a schematic diagram of a system for monitoring a scarper chain based on a measurement on transmittance of a torsion spring and a method thereof provided by an embodiment of the present disclosure.
Figure 2:
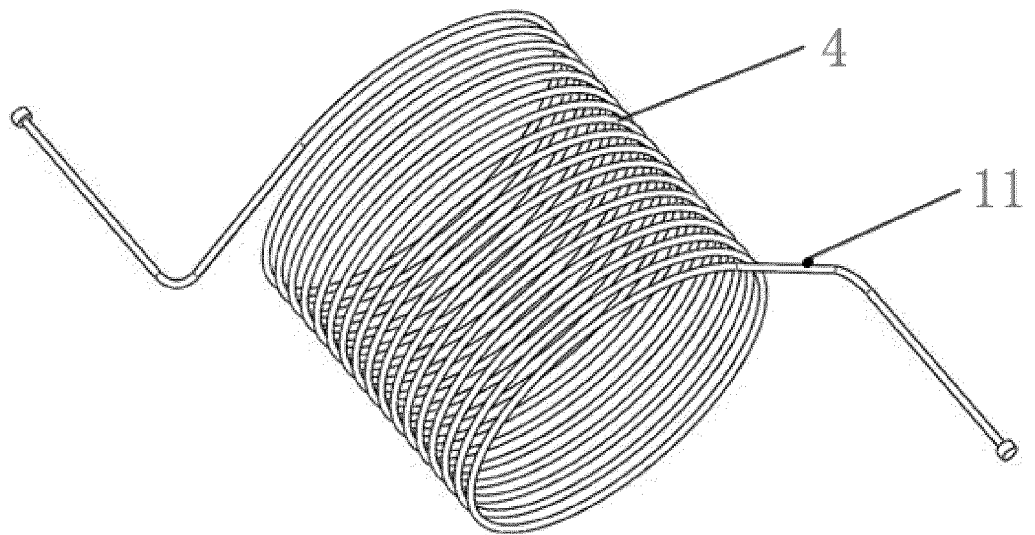
FIG. 2 illustrates a schematic diagram of a torsion spring and a support provided by an embodiment of the present disclosure.
Figure 3:
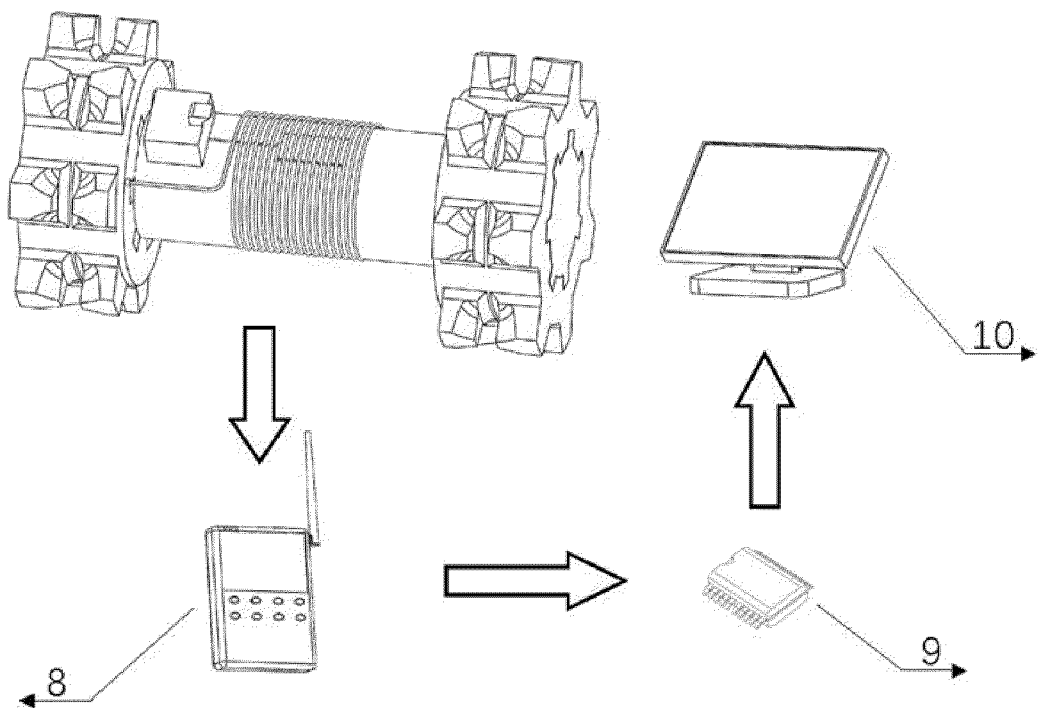
FIG. 3 illustrates a diagram of signal transmission among a signal acquisition device, a wireless receiver, an A/D converter, and an industrial computer provided by an embodiment of the present disclosure.
Figure 4:
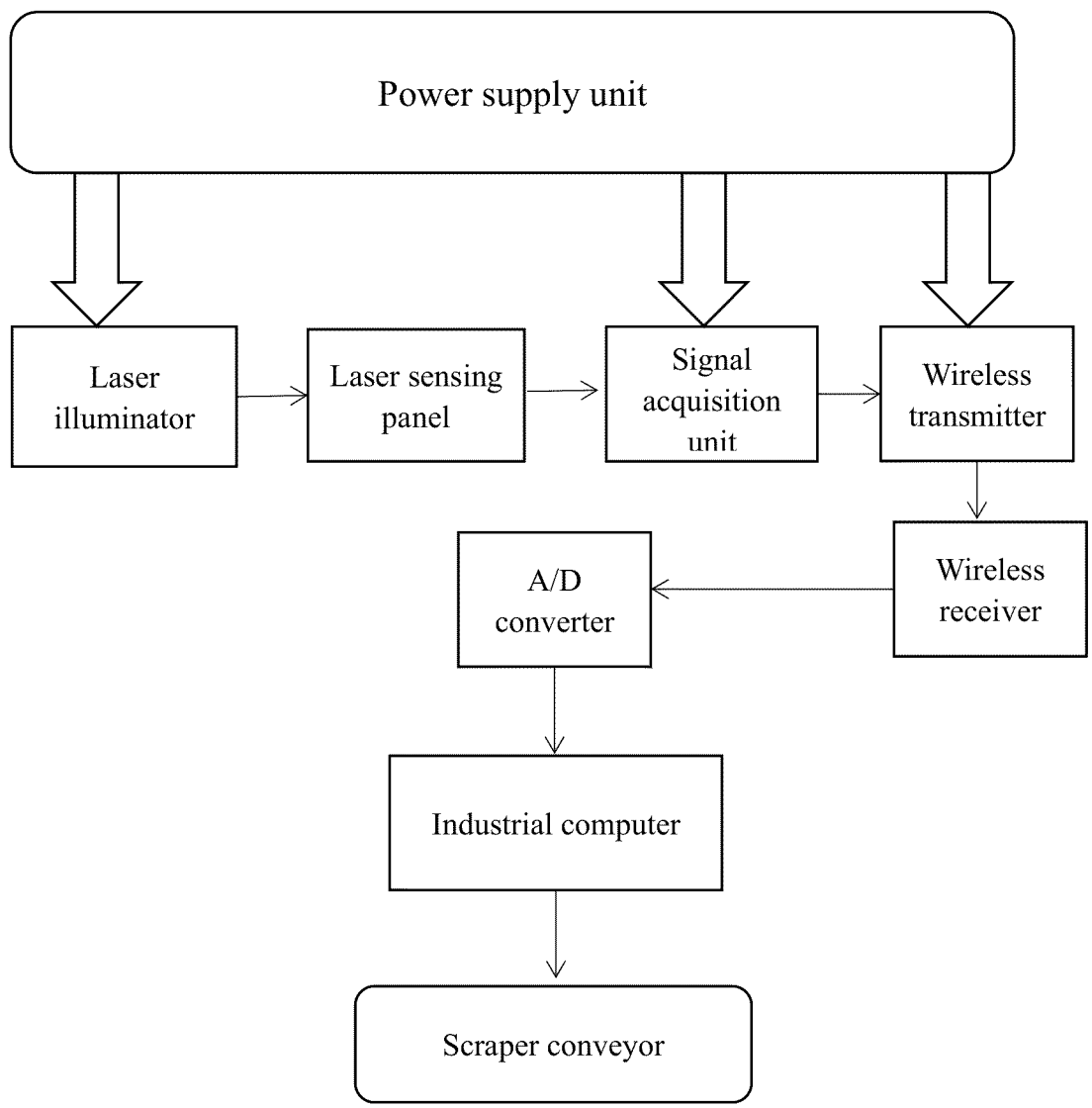
FIG. 4 illustrates a flow chart of the monitoring system provided by an embodiment of the present disclosure.

As illustrated in FIGS. 1 to 4, a system for monitoring a scarper chain based on a measurement on transmittance of a torsion spring is provided. The system includes a sprocket-wheel torsion detection device, a fixing device 7, a wireless receiver 8, an A/D converter 9 and an industrial computer 10. The sprocket-wheel torsion detection device includes a transmission shaft 6 with sprocket wheels 5 fixed at both ends of the transmission shaft 6. A middle part of the transmission shaft 6 is sheathed in a torsion spring 4. Both ends of the torsion spring 4 are fixedly connected to one end face of the sprocket wheels 5 at a side proximate to the transmission shaft 6 through a support 11, respectively. A laser sensing panel 3 is adhered to a middle part of an outer surface of the transmission shaft 6. The laser sensing panel 3 is covered by the torsion spring 4 with a certain distance from the torsion spring. A laser illuminator 1 is provided at a middle position on a top of the fixing device 7, and the illuminating end of the laser illuminator 1 is aligned with a sensing area of the laser sensing panel 3. A signal acquisition device, a wireless transmitter and a power supply unit are further arranged in the fixing device 7. The power supply unit is respectively electrically connected with the laser illuminator 1, the signal acquisition device and the wireless transmitter. The signal acquisition device is electrically connected with the wireless transmitter. The laser sensing panel 3 is electrically connected with the signal acquisition device in the fixing device 7 through a shielded conductive wire 2, and the wireless receiver 8, the A/D converter 9 and the industrial computer 10 are electrically connected to one another in sequence.

The both ends of the torsion spring 4 are fixedly connected to the end face of the sprocket wheels 5 at the side proximate to the transmission shaft 6 by welding, respectively.

Safety distances between welding joints at the both ends of the torsion spring 4 and the fixing device 7 are maintained to prevent the torsion spring 4 from contacting and colliding with the fixing device 7 at a deformation limit.

The torsion spring 4 is in a type of a separately-wound type and gaps between coils of the torsion spring are maintained. The torsion spring 4 is in a loosened state when installing, where an illuminated area of the laser sensing panel 3 accounts for 50% of a total area of the laser sensing panel 3, and the torsion spring 4 is installed coaxially with the transmission shaft 6 and maintains a certain distance from a surface of the transmission shaft 6.

The fixing device 7 is in a shape of a square box, and the wireless transmitter, the signal acquisition device and the power supply unit are all integrated in the square box.

Coils of the torsion spring 4 are capable of covering the laser sensing panel 3 completely both at a compression limit and at a stretch limit.

The laser illuminator 1 is installed at a middle part of an upper end face of the fixing device 7, and emits a visible light laser to the sensing area of the laser sensing panel 3 when the system is in operation.

The operating principle are as follows. The laser illuminator 1 is installed at a top of the fixing device 7, safety distances are maintained between the coils of the torsion spring 4 and the laser sensing panel, the torsion spring 4 is deformed caused by the relative rotation of sprocket wheel, which changes the density of the working coils. The laser illuminator 1 irradiates the laser on the laser sensing panel 3 at the bottom of the coils through the gaps between the working coils of the torsion spring 4, different magnitudes of currents are generated by the laser sensing panel 3, which achieves the conversion from the torsion change of the sprocket wheel to the current change. The current signal acquired by the wireless transmitter in the fixing device 7 is transmitted to the wireless receiver 8, and the signal is transmitted to the A/D converter by the wireless receiver 8, the digital signal is transmitted to industrial computer 10 by the A/D converter after sampling, quantization and encoding. A torsion range of the sprocket wheel is calculated by the industrial computer 10 through comparing the current values with the presetting current threshold to determine whether the chain of the scraper conveyor is broken or stuck.

Provided in the embodiments of the present disclosure is further a method for monitoring a scraper chain based on a measurement on transmittance of a torsion spring. The method specifically includes the following steps.

In S1, an industrial computer 10 is initialized, and threshold currents I1, I2, I3, I4, I5 and I6 are set sequentially corresponding to different current values I generated for an illuminated area of a laser sensing panel 3 being of 5%, 25%, 45%, 55%, 75% or 95%.

In S2, a current signal I of the laser sensing panel 3 is acquired in real time by a signal acquisition device, and the signal is transmitted transmitted to the industrial computer 10 during a normal operation of a scarper conveyor.

In S3, the obtained current signal I is compared with the threshold current by the industrial computer 10. It is determined that the illuminated area S of the laser sensing panel 3 is greater than or equal to 5% and less than or equal to 25%, when $I1 \leq I \leq I2$; it is determined the illuminated area S of the laser sensing panel 3 is greater than 25% and less than or equal to 45%, when $I2 < I \leq I3$; it is determined that the illuminated area S of the laser sensing panel 3 is greater than 45% and less than or equal to 55%, when $I3 < I \leq I4$; it is determined that the illuminated area S of the laser sensing panel 3 is greater than 55% and less than or equal to 75%, when $I4 < I \leq I5$; and it is determined that the illuminated area S of the laser sensing panel 3 is greater than 75% and less than or equal to 95%, when $I5 < I \leq I6$.

In S4, a range of S is calculated by the industrial computer 10 through the current signal I obtained in real time, and a varying range of M is calculated by a formula of $$M = \frac{2\pi^2 Ed^3 c}{3667 abH} \left( \frac{abc - abdn_0}{c} - S \right)$$

; when $5\% \leq S \leq 25\%$, $M1 \leq M \leq M2$; when $25\% < S \leq 45\%$, $M2 < M \leq M3$; when $45\% < S \leq 55\%$, $M3 < M \leq M4$; when $55\% < S \leq 75\%$, $M4 < M \leq M5$; when $75\% < S \leq 95\%$, $M5 < M \leq M6$;

where, M denotes a torque acting on the torsion spring, positive and negative signs of values of M denotes that whether a direction of the torque is the same as a spiral direction of the torsion spring, E denotes an elastic modulus of a material of the torsion spring, d denotes a diameter of coils of the torsion spring, c denotes an axial length of a number of the working coils of the torsion spring, a denotes a width of the laser sensing panel, b denotes a length of the laser sensing panel, H denotes a stretched length of the torsion spring (excluding the supports 11 at both ends), n0 denotes an initial number of the coils of the torsion spring, and S denotes the illuminated area of the laser sensing panel.

In S5, whether the chain of the scraper conveyor is broken to stuck is determined according to the calculated range of S by the industrial computer 10. It is determined that the chain of the scarper conveyor is broken, when $I1 < I \leq I2$, that is, $M1 < M \leq M2$ or $I5 < I \leq I6$, that is, $M5 < M \leq M6$; it is determined that the chain of the scarper conveyor is stuck, when $I2 < I \leq I3$, that is, $M2 < M \leq M3$ or $I4 < I \leq I5$, that is $M4 < M \leq M5$; and it is determined that the chain of the scarper conveyor is operated normally, when $I3 < I \leq I4$, that is, $M3 < M \leq M4$.

In S6, Steps S2 to S5 are repeated to monitor the chain of the scarper conveyor in real time.

It will be apparent that those skilled in the art can make various modifications and variations to the present disclosure without departing from the spirit and scope of the present disclosure. Thus, if these modifications and variations to the present disclosure fall within the scope of the appended claims and its equivalent technology, the present disclosure is also intended to cover these modifications and variations.

The invention claimed is:

1. A system for monitoring a scarper chain based on a measurement on transmittance of a torsion spring, characterized by comprising a sprocket-wheel torsion detection device, a fixing device, a wireless receiver, an A/D converter and an industrial computer, wherein the sprocket-wheel torsion detection device comprises a transmission shaft with sprocket wheels fixed at both ends of the transmission shaft, a middle part of the transmission shaft is sheathed in a torsion spring, both ends of the torsion spring are fixedly connected to one end face of the sprocket wheels at a side proximate to the transmission shaft through a support, respectively, a laser sensing panel is adhered to a middle part of an outer surface of the transmission shaft, the laser sensing panel is covered by the torsion spring with a certain distance from the torsion spring, the fixing device is provided with a laser illuminator, an illuminating end of the laser illuminator is aligned with a sensing area of the laser sensing panel, and a signal acquisition device, a wireless transmitter and a power supply unit are further arranged in the fixing device, the power supply unit is respectively electrically connected with the laser illuminator, the signal acquisition device and the wireless transmitter, the signal acquisition device is electrically connected with the wireless transmitter, the laser sensing panel is electrically connected with the signal acquisition device in the fixing device through a shielded conductive wire, and the wireless receiver, the A/D converter and the industrial computer are electrically connected to one another in sequence.

2. The system for monitoring the scarper chain based on the measurement on the transmittance of the torsion spring according to claim 1, wherein, the both ends of the torsion spring are fixedly connected to the end face of the sprocket wheels at the side proximate to the transmission shaft by welding, respectively.

3. The system for monitoring the scarper chain based on the measurement on the transmittance of the torsion spring according to claim 2, wherein, safety distances between welding joints at the both ends of the torsion spring and the fixing device are maintained to prevent the torsion spring from contacting and colliding with the fixing device at a deformation limit.

4. The system for monitoring the scarper chain based on the measurement on the transmittance of the torsion spring according to claim 1, wherein, the torsion spring is in a type of a separately-wound type and gaps between coils of the torsion spring are maintained, the torsion spring is in a loosened state when installing, where an illuminated area of the laser sensing panel accounts for 50% of a total area of the laser sensing panel, and the torsion spring is installed coaxially with the transmission shaft and maintains a certain distance from a surface of the transmission shaft.

5. The system for monitoring the scarper chain based on the measurement on the transmittance of the torsion spring according to claim 1, wherein, the fixing device is in a shape of a square box, and the wireless transmitter, the signal acquisition device and the power supply unit are all integrated in the square box.

6. The system for monitoring the scarper chain based on the measurement on the transmittance of the torsion spring according to claim 1, wherein, coils of the torsion spring are capable of covering the laser sensing panel completely both at a compression limit and at a stretch limit.

7. The system for monitoring the scarper chain based on the measurement on the transmittance of the torsion spring according to claim 1, wherein, the laser illuminator is installed at a middle part of an upper end face of the fixing device, and emits a visible light laser to the sensing area of the laser sensing panel when the system is in operation.

8. A method for monitoring a scarper chain based on a measurement on transmittance of a torsion spring, characterized by specifically comprising following steps:

S1, initializing an industrial computer, and setting threshold currents I1, I2, I3, I4, I5 and I6 sequentially corresponding to different current values I generated for an illuminated area of a laser sensing panel being of 5%, 25%, 45%, 55%, 75%, or 95%;

S2, acquiring, by a signal acquisition device, a current signal I of the laser sensing panel in real time and transmitting the signal to the industrial computer during a normal operation of a scarper conveyor;

S3, comparing, by the industrial computer, the obtained current signal I with the different threshold currents, and determining, when I1≤I≤I2, that the illuminated area S of the laser sensing panel is greater than or equal to 5% and less than or equal to 25%, determining, when I2<I≤I3, that the illuminated area S of the laser sensing panel is greater than 25% and less than or equal to 45%, determining, when I3<I≤I4, that the illuminated area S of the laser sensing panel is greater than 45% and less than or equal to 55%, determining, when I4<I≤I5, that the illuminated area S of the laser sensing panel is greater than 55% and less than or equal to 75%, and determining, when I5<I≤I6, that the illuminated area S of the laser sensing panel is greater than 75% and less than or equal to 95%;

S4, calculating, by the industrial computer, a range of S through the current signal I obtained in real time, and a varying range of M according to a formula $$M = \frac{2\pi^2 Ed^3 c}{3667abH}\left(\frac{abc - abdn_0}{c} - S\right),$$

when 5%≤S≤25%, M1≤M≤M2; when 25%<S≤45%, M2<M≤M3; when 45%<S≤55%, M3<M≤M4; when 55%<S≤75%, M4<M≤M5; when 75%<S≤95%, M5<M≤M6; and where M denotes a torque acting on the torsion spring, positive and negative signs of values of M denote that whether a direction of the torque is the same as a spiral direction of the torsion spring, E denotes an elastic modulus of a material of the torsion spring, d denotes a diameter of coils of the torsion spring, c denotes an axial length of a number of the working coils of the torsion spring, a denotes a width of the laser sensing panel, b denotes a length of the laser sensing panel, H denotes a stretched length of the torsion spring, n0 denotes an initial number of the coils of the torsion spring, and S denotes the illuminated area of the laser sensing panel;

S5, determining, by the industrial computer, that whether the chain of the scraper conveyor is broken or stuck according to the calculated range of S:

determining, when I1<I≤I2, that is, M1<M≤M2, or I5<I≤I6, that is, M5<M≤M6, that the chain of the scarper conveyor is broken;

determining, when I2<I≤I3, that is, M2<M≤M3, or I4<I≤I5, that is, M4<M≤M5, that the chain of the scarper conveyor is stuck; and determining, when I3<I≤I4, that is, M3<M≤M4, that the chain of the scarper conveyor is operating normally; and S6, repeating Steps S2 to S5 to monitor the chain of the scarper conveyor in real time.

* * * * *